Nov. 29, 1932.   T. ZERBI   1,889,305
ENGINE DRIVE FOR AIRCRAFT PROPELLERS
Filed Oct. 14, 1930
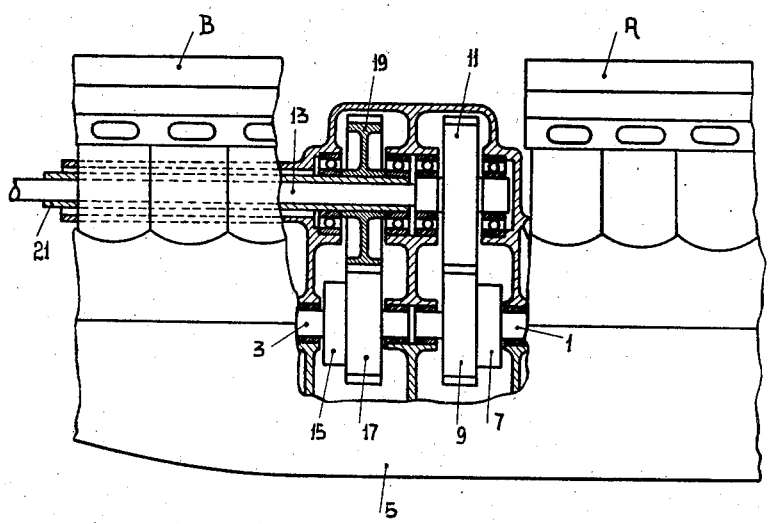
Inventor
Tranquillo Zerbi.
By [signature]
atty.

Patented Nov. 29, 1932

1,889,305

UNITED STATES PATENT OFFICE

TRANQUILLO ZERBI, OF TURIN, ITALY, ASSIGNOR TO FIAT SOCIETÀ ANONIMA, OF TURIN, ITALY

ENGINE DRIVE FOR AIRCRAFT PROPELLERS

Application filed October 14, 1930, Serial No. 488,678, and in Italy April 26, 1930.

This application refers to improvements in devices for coupling two or a plurality of aircraft engines with tractive propellers rotating in opposite directions mounted on two co-axial shafts, one of which is made hollow.

The improvements according to this application refer more particularly to the unit comprising the two engines arranged in tandem with co-axial crankshafts. Power is transmitted from the crankshafts to the concentric propeller shafts through suitable gears preferably situated on the inner adjacent ends of the two engines.

According to this invention couplings of any suitable type, e. g. hand-operated or automatic friction couplings are interposed between the crankshafts and the gears transmitting power to the propeller shafts.

The accompanying drawing shows, by way of example, a constructional form of the object of this invention in a partially sectional side view.

A and B denote two engines, having coaxial crankshafts 1 and 3, mounted on the same casing 5. The shaft 1 carries with the interposition of a suitable coupling 7 a toothed wheel 9 meshing with a toothed wheel 11 keyed on the shaft 13 driving one propeller.

The crankshaft 3 is also connected through a coupling 15 to a toothed wheel 17 meshing with a toothed wheel 19 mounted on the hollow shaft 21 driving the second tractive propeller and co-axial to the shaft 13.

The connecting gearing for the two engines and their respective propeller shafts is arranged between the said engines and is provided with a suitable gear box integral with said casing 5, thereby forming a compact streamline unit.

As the two propellers must rotate in opposite directions, the two engines A and B shall be rotated in opposite directions, or a reverse gear is interposed in one of the toothed wheel pairs 9—11 or 17—19 permitting the two engines to turn in the same direction, while the propellers coupled therewith turn in opposite directions. Due to the fact that the two engines are mounted on a single common crankshaft casing, oil in the casing may obviously flow from one end to the other thereby simplifying the lubrication of the unit.

It will be obvious that the device according to this invention can be used also in connection with other engine types. In case the two co-axial shafts 13 and 21 cannot extend through the V-hollow determined by the two parallel cylinder rows of the two engines, the gears 11, 19 can be placed in any suitable position or diametrally opposite the position shown in the example illustrated on the drawing. In this case in order to avoid the engine taking up too much space at its front end, the engine can be mounted on the aircraft with its cylinders in an inverted V-arrangement or in any other suitable position.

In the example shown the two transmitting gears serve also as reducing gears for the engines, but it will be clear that the said gears could transmit power to the propellers without any reduction of the number of turns of the engine.

What I claim is:

1. A power transmission unit for aircraft comprising in combination, a single engine casing, two sets of working cylinders mounted in tandem and in longitudinal alignment in said casing and having separate crankshafts, two coaxial propeller shafts mounted in the casing, transmission gears mounted on adjacent ends of the said crankshaft inside the said casing and means for connecting each transmission gear with a separate propeller shaft, whereby lubricating oil in the lower part of said casing may flow freely from one end thereof to the other for lubrication of the said unit.

2. A power transmission unit for aircraft comprising in combination, a single engine casing, two sets of working cylinders mounted in tandem and in longitudinal alignment in said casing, separate crankshafts for said sets of working cylinders, two co-axial propeller shafts mounted in the casing, transmission gears mounted on adjacent ends of said crankshafts, means for connecting each transmission gear with a separate propeller shaft and a gear box integral with the said casing for enclosing said gears and propeller shafts, whereby lubricating oil in the lower part of said casing may flow freely from one end thereof to the other for lubrication of the unit.

In testimony that I claim the foregoing as my invention, I have signed my name.

TRANQUILLO ZERBI.